March 3, 1942.  A. M. WALLACE  2,275,274
METHOD AND APPARATUS FOR SUSTAINING HEATED WORKPIECES
Filed Oct. 16, 1939
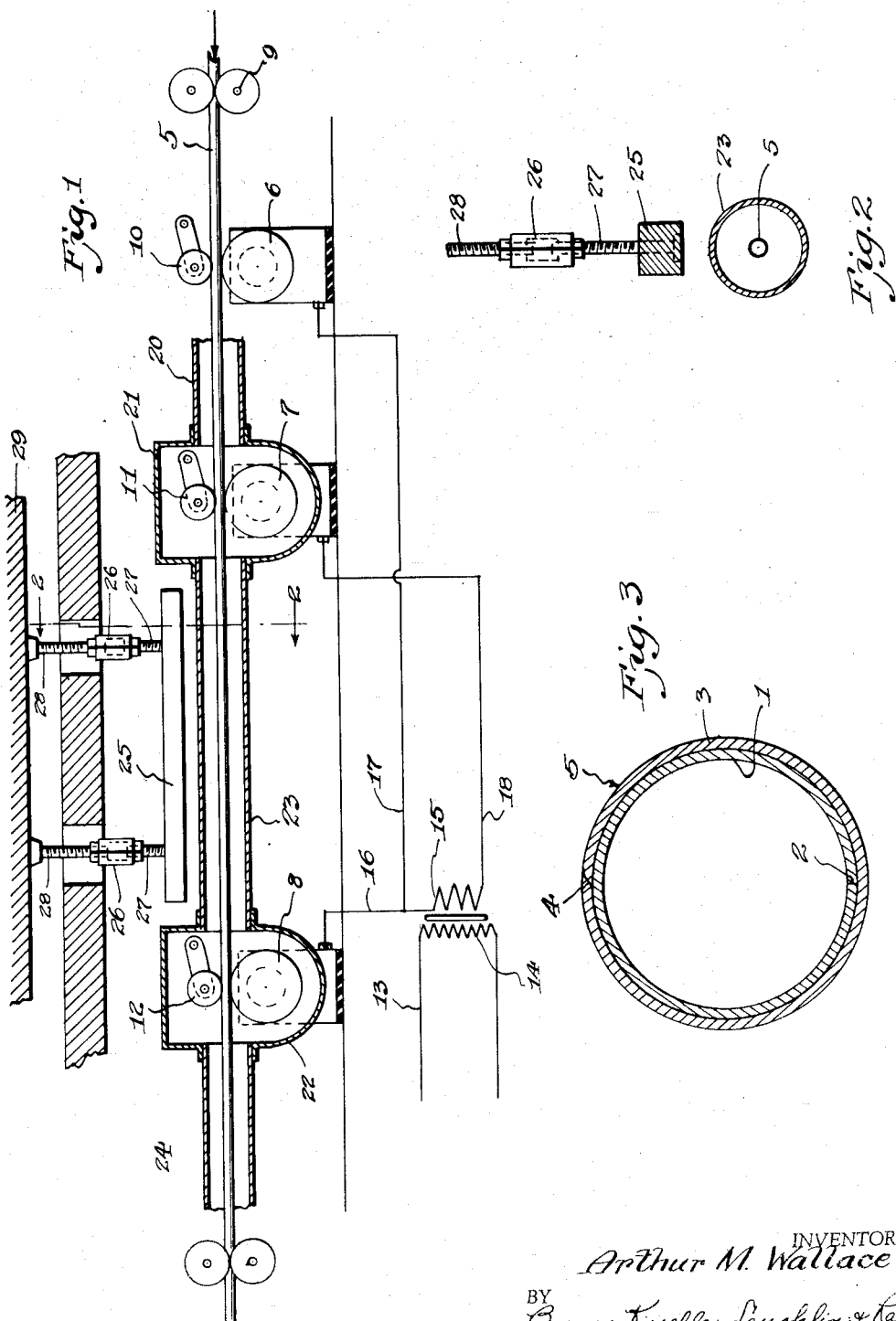
INVENTOR.
Arthur M. Wallace
BY
Barnes, Kisselle, Laughlin & Raisch
ATTORNEYS Patented Mar. 3, 1942

2,275,274

UNITED STATES PATENT OFFICE 2,275,274

METHOD AND APPARATUS FOR SUSTAINING HEATED WORKPIECES

Arthur M. Wallace, Detroit, Mich., assignor to Bundy Tubing Company, Detroit, Mich., a corporation of Michigan Application October 16, 1939, Serial No. 299,751

7 Claims. (Cl. 219—11)

This invention has to do with an apparatus and method where a work piece comprising a long length of metal stock such as tubing, rod, strip, or the like, is subjected to a heat treatment and where one or more sections or portions of the heated length bridges supports which are spaced longitudinally of the length of material.

This invention is directed particularly to and is applicable to the making of tubing, where the tubing is moved lengthwise and successive sections thereof subjected to heat for the purpose of sealing the tube with metal, or both, or otherwise heat treating the tube. The successive sections which bridge spaced supports, particularly where the span is relatively long and the temperature is high, may sag by reason of the action of gravity, or be misplaced by any outside force, and thus cause mechanical distortion which would be objectionable or not acceptable, and this may take place with rod, strip or tube. In accordance with the invention the length of heated material thus supported is sustained by a magnetic action which may be set up by the passing of an electric current through the length of material, and this current may supply the energy which heats the tube by electrical resistance. Thus where the work piece is heated by electrical resistance, the invention makes use of the fact that the length of material itself is carrying an electric current and the arrangement provides for a magnetic attraction of the tube to overcome or substantially balance the action of gravity or other outside force to prevent sagging or displacement of the heated length of material.

An arrangement is shown in the accompanying drawing for carrying out the invention.

Fig. 1 is a view illustrating a structure made in accordance with the invention and showing somewhat diagrammatically an apparatus for the making of tube.

Fig. 2 is a somewhat enlarged sectional view taken substantially on line 2—2 of Fig. 1.

Fig. 3 is an enlarged sectional view of a form of tube which may be made.

The apparatus generally illustrated in Fig. 1, insofar as the heating of the tube is concerned, is of the type shown in the Bert L. Quarnstrom application Serial No. 229,015, filed September 8, 1938 (now Patent No. 2,223,270, dated November 26, 1940). This apparatus may be used to perform operations upon different tube structures, one of which is exemplified in Fig. 3. This tube comprises an inner ply 1 having abutting edges forming a seam 2 and an outer ply 3 having scarfed edges forming a seam 4. These plies may be of sheet steel and some or all of the surfaces of either one or both plies, may be coated with a sealing metal, such as soft or hard solder and including the cuprous sealing metal which may be a copper alloy or commercially pure copper. The hard solders have a higher melting temperature than the soft solders, as of course, is also the case with copper, and the invention is particularly useful where a high melting point sealing metal is used.

The tube, as a whole, is indicated at 5, and it is formed on a suitable tube mill which may include rolls 9 which may aid in propelling the tube, and it may move through the apparatus as shown in Fig. 1 in the direction from right to left. The apparatus includes electrodes which may be roller electrodes 6, 7 and 8 and across which the tube moves, and the tube may be held by additional rollers 10, 11 and 12 which may or may not be connected in an electrical circuit. A power line is indicated at 13 connected to primary windings 14 of the transformer, while the secondary windings are illustrated at 15. The electrodes 6 and 8 are connected to one side of the secondary by conductors 16 and 17, while the intermediate electrode 7 is connected to the opposite side of the secondary by conductor 18. It will be apparent that as the tube moves across the electrodes that it completes the circuit and the electric current flows through the tube between the electrodes 6 and 7 and the electrodes 8 and 7. There is no potential between the electrodes 6 and 8, and thus these do not need to be insulated from each other through the rest of the machine. However, insofar as the present invention is concerned different electrical circuits and electrical arrangements may be employed.

Some of the electrodes and the space therebetween may be enclosed in a suitable housing structure. After the tube moves across electrode 6 it may enter a housing member 20 and the electrodes 7 and 8 may be enclosed as at 21 and 22, and an enclosing tube or housing 23 may confine the span of tube between the electrodes 7 and 8, and the heated tube may continue in a housing or tube 24.

As the tube moves the electrical current passing through successive sections thereof heats the tube to a desirable temperature, depending upon the treatment to be given to the tube and, of course, depending largely upon the melting point of the sealing metal or sealing and coating metal where it is desired to render such metal molten. In the case of the use of copper, for example, the tube may be raised to a temperature in excess of copper melting temperature if the sealing action is desired. The arrangement may be such that the tube may be substantially brought up to temperature between the electrodes 6 and 7, and then this temperature substantially maintained in that span between the electrodes 7 and 8. A suitable processing atmosphere may be maintained in the housing structure, as for example, a reducing or non-oxidizing atmosphere where the formation of oxides are to be prevented.

The span of tube between electrodes 7 and 8, as will be noted, is indicated as being relatively long; and due to the action of gravity the heated tube tends to gravitate, and it may contact with the housing 23, or the tube may be otherwise caused to have mechanical distortions or defects. Since the tube carries a current, however, the invention contemplates making use of the current to prevent this sag. To this end a body or bar of magnetic material 25 is positioned adjacent the tube preferably in an adjustable manner. As indicated the bar 25 may be adjusted toward and away from the tube by turn buckles 26, screwthreaded on supporting screwthreaded members 27 and 28 suspended from a support 29. Any suitable means for supporting and adjusting a magnetic substance may be used. The housing or tube 23 is of a non-magnetic material such as a suitable non-magnetic metallic alloy or ceramic metal or the like, so that the lines of magnetic flux may pass therethrough and not be shunted short of the magnetic element 25.

The member 25 may be soft ferrous metal which possesses a little residual magnetism. The electrical conductor, which is the tube in this case, and the body 25 are accordingly attracted to each other. The amount of attraction is substantially proportional to the value of current in the tube, the amount or mass of magnetic material and the distance between the conductor and the magnetic material. In an apparatus of this type which is set up to perform a given treatment on a tube, the value of the electric current may remain substantially constant; a body of magnetic material of about the requisite amount or mass may be selected and then the magnetic pull or attraction of the tube can be varied and set by the simple expedient of adjusting the mass of magnetic material toward and away from the tube. This adjustment may be made until the desired action on the tube is obtained. If it is desired to just overcome or balance out the action of gravity, the adjustment may be made so that the tube is maintained in a substantially straight path between the bridged electrodes. Also where a given treatment is to be performed on the tube, the tube will be caused to move at a substantially constant velocity so that with the substantially constant current value, successive sections are substantially uniformly heated.

In the form of apparatus shown there is no support for the tube between the electrodes 6 and 7. These electrodes are shown as being relatively close to each other, and the tube is cold at the electrode 6. The temperature of the tube is elevated as it approaches the electrode 7, with the result that the tube may come up substantially to the desired temperature approximately at the electrode 7. Thus the tube structure between the electrodes 6 and 7 may not need to be sustained, although it is within the invention to so sustain the tube between these electrodes.

The detailed disclosure herein has been made with reference to tubing, but it is to be understood that the invention is applicable to other long work pieces such as rod, or strip, as above mentioned.

I claim:

1. In an apparatus for treating a metallic work piece in the form of a rod, strip or tube, the combination of means for passing electric current longitudinally through the work piece to heat the same and for supporting the heated work piece at longitudinally spaced points, and a body of magnetic material disposed in the field of flux set up by the current in the work piece to sustain the heated work piece against outside forces such as gravity.

2. In an apparatus for treating a metallic work piece in the form of a rod, strip or tube, means for passing the work piece lengthwise, electrodes spaced lengthwise of the tube and for contacting the tube, said electrodes being connected in an electric circuit which is closed by the work piece whereby the section of the work piece between the electrodes is heated by electrical resistance, and a body of magnetic material disposed in the field of flux set up by said current and positioned so that the attraction between the work piece and the body sustains said section of the work piece against outside forces such as gravity.

3. In an apparatus for treating a metallic work piece in the form of a rod, strip or tube, the combination of means for moving the work piece lengthwise and substantially horizontally, spaced electrodes connected in an electric circuit for engaging and supporting the work piece at longitudinally spaced points whereby the work piece is heated by electrical resistance, and a body of magnetic material disposed above the work piece and positioned in the field of magnetic flux set up by the said current to support the heated work piece against forces such as gravity.

4. In an apparatus for treating a metallic work piece in the form of a rod, strip or tube, the combination of means for supporting a heated section of the work piece at longitudinally spaced points and for passing an electric current longitudinally through the heated section, and a body of magnetic material disposed in the field of flux set up by said current to sustain the heated section against outside forces such as gravity.

5. In a method which involves the heating of a metallic work piece in the form of a rod, strip or tube, and the supporting of the heated work piece at longitudinally spaced points; the steps of passing an electrical current longitudinally through a supported section of the work piece and sustaining the work piece against outside force such as the pull of gravity by a magnetic body placed within the field of flux set up by the electrical current in the work piece.

6. In a method of treating a metallic work piece in the form of a rod, strip or tube, which involves the supporting of the work piece at longitudinally spaced points and the passing of an electrical current through a portion of the tube to heat the same; the step of sustaining the heated work piece against outside forces such as the pull of gravity by the attraction between the tube and a magnetic body disposed within the field of flux set up by said current.

7. In a method which involves the moving of a metallic work piece in the form of a tube, strip or rod lengthwise, the passing of an electrical current longitudinally through successive sections thereof to heat the same, and the supporting of the heated sections at longitudinally spaced points; the step of sustaining the heated sections against outside forces such as the pull of gravity by the attraction between the tube and a magnetic body disposed within the field of flux set up by the current in the tube.

ARTHUR M. WALLACE.